US008423732B1

(12) United States Patent
Rajan

(10) Patent No.: US 8,423,732 B1
(45) Date of Patent: Apr. 16, 2013

(54) WRITABLE VIRTUAL DISKS OF READ-ONLY SNAPSHOT FILE OBJECTS

(75) Inventor: Vijayan Rajan, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 356 days.

(21) Appl. No.: 12/277,053

(22) Filed: Nov. 24, 2008

Related U.S. Application Data

(62) Division of application No. 10/412,478, filed on Apr. 11, 2003, now Pat. No. 7,457,982.

(51) Int. Cl.
*G06F 12/00* (2006.01)
*G06F 13/00* (2006.01)
*G06F 13/28* (2006.01)
*G06F 11/00* (2006.01)

(52) U.S. Cl.
USPC ............... 711/162; 714/6.1; 714/15; 714/20

(58) Field of Classification Search .................. 711/162
See application file for complete search history.

(56) References Cited

U.S. PATENT DOCUMENTS

| 4,570,217 A | 2/1986 | Allen et al. |
| 5,124,987 A | 6/1992 | Milligan |
| 5,163,131 A | 11/1992 | Row et al. |
| 5,202,979 A | 4/1993 | Hillis et al. |
| 5,278,979 A | 1/1994 | Foster et al. |
| 5,355,453 A | 10/1994 | Row et al. |
| 5,403,639 A | 4/1995 | Belsan |
| 5,410,667 A | 4/1995 | Belsan |
| 5,454,103 A * | 9/1995 | Coverston et al. ............... 1/1 |
| 5,485,579 A | 1/1996 | Hitz et al. |
| 5,581,724 A | 12/1996 | Belsan |
| 5,802,366 A | 9/1998 | Row et al. |
| 5,819,292 A | 10/1998 | Hitz et al. |
| 5,931,918 A | 8/1999 | Row et al. |
| 5,941,972 A | 8/1999 | Hoese et al. |
| 5,948,110 A | 9/1999 | Hitz et al. |
| 5,950,225 A | 9/1999 | Kleiman |
| 5,963,962 A | 10/1999 | Hitz et al. |
| 6,038,570 A | 3/2000 | Hitz et al. |
| 6,061,770 A | 5/2000 | Franklin |
| 6,065,037 A | 5/2000 | Hitz et al. |
| 6,081,875 A | 6/2000 | Clifton et al. |
| 6,138,126 A | 10/2000 | Hitz et al. |
| 6,173,293 B1 * | 1/2001 | Thekkath et al. ............... 1/1 |
| 6,205,450 B1 | 3/2001 | Kanome |

(Continued)

OTHER PUBLICATIONS

Linux Filesystem (Jun. 19-21, 2001, hereinafter "Linux," available at http://www.inf.fu-berlin.de/lehre/SS01/OS/Lectures/Lecture16.pdf).*

(Continued)

*Primary Examiner* — Yaima Campos
*Assistant Examiner* — Craig Goldschmidt
(74) *Attorney, Agent, or Firm* — Cesari and McKenna, LLP

(57) ABSTRACT

A technique enables creation and use of a writable, read-only snapshot of an active file system operating on a storage system, such as a multi-protocol storage appliance. The writable, read-only snapshot comprises a read-only "image" (file) residing in a snapshot and a writable virtual disk (vdisk) residing in the active file system. The writable vdisk is a "shadow" image of the snapshot file image and, as such, includes an attribute that specifies the snapshot file as a backing store.

20 Claims, 10 Drawing Sheets

U.S. PATENT DOCUMENTS

| | | | |
|---|---|---|---|
| 6,289,356 | B1 | 9/2001 | Hitz et al. |
| 6,341,341 | B1 | 1/2002 | Grummon |
| 6,425,035 | B2 | 7/2002 | Hoese et al. |
| 6,516,344 | B1* | 2/2003 | Nazari .......................... 709/217 |
| 6,848,106 | B1* | 1/2005 | Hipp ............................ 719/312 |
| 6,961,833 | B2* | 11/2005 | Leung .......................... 711/163 |
| 7,107,385 | B2 | 9/2006 | Rajan et al. |
| 7,457,982 | B2 | 11/2008 | Rajan |
| 2002/0112022 | A1 | 8/2002 | Kazar et al. |
| 2002/0116593 | A1 | 8/2002 | Kazar et al. |
| 2004/0030668 | A1 | 2/2004 | Pawlowski et al. |

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

David Hitz et al. TR3002 File System Design for a NFS File Server Appliance, published by Network Appliance, Inc., Jan. 1994.

NCITS 332-1999 Fibre Channel Arbitrated Loop (FC-AL-2) published by the American National Standards Institute, Dec. 1999.

ANSI X3.230-1994, Fibre Channel Physical and Signaling Interface (FC-PH), Nov. 1994.

SunOS MAN Pages, Maintenance Procedures ND (8C) nd-network disk control, published by Sun Microsystems, Feb. 1985.

SunOS Man Pages, Misc. Reference Manual Pages ND (4P) nd-network disk driver, published by Sun Microsystems, Jul. 26, 1985.

Performance Without Compromise: The Virtual Storage Architecture 1997.

Rosenblum, Mendel, *The Design and Implementation of a Log-Structured File System*, published by ACM Transactions on Computer Systems, Oct. 1991, pp. 1-93.

Sidebotham, Bob, *Volumes: The Andrew File System Data Structuring Primitive*, EEUG Conference Proceedings, Manchester, UK, Sep. 1986.

Howard, John H., *An Overview of the Andrew File System*, Carnegie Mellon University, CMU-ITC-88-062, Feb. 1988.

Kazar, Michael Leon, *Synchronization and Caching Issues in the Andrew File System*, Carnegie Mellon University, CMU-ITC-88-063, Feb. 1988.

Bitton, Dina, *Disk Shadowing*, Proceedings of the 14$^{th}$ VLDB Conference, LA, CA, Sep. 1988.

Chutani, Sailesh, et al., *The Episode File System*, In Proceedings of the USENIX, Jan. 1992.

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

NCI TS 332-1999 Fibre Channel Arbitrated Loop (FC-AL-2) published by the American National Standards Institute.

Ansi X3.230-1994, Fibre Channel Physical and Signaling Interface (FC-PH).

Maintenance Procedures ND (8C) nd-network disk control Feb. 1985.

Misc. Reference Manual Pages ND (4P) nd-network disk driver Jul. 26, 1985.

Asante EN/SC Adapter Family Installation Guide May 1994.

Asante Desktop EN/SC Adapters User's Manual Apr. 1996.

Anthony J. McGregor Department of Computer Science, University of Waikato Dissertation: Block-Based Distributed File Systems Jul. 1997.

Siddha, et al. A Persistent Snapshot Device Driver for Linux, in Proceedings of the 5$^{th}$ Annual Linux Showcase & Conference, Oakland, CA USA, Nov. 5-10, 2001.

* cited by examiner

WRITABLE VIRTUAL DISKS OF READ-ONLY SNAPSHOT FILE OBJECTS

RELATED APPLICATIONS

This application is a divisional of U.S. Ser. No. 10/412,478, issued as U.S. Pat. No. 7,457,982 on Nov. 25, 2008, filed by Vijayan Rajan on Apr. 11, 2003, entitled WRITABLE VIRTUAL DISKS OF READ-ONLY SHAPSHOT FILE OBJECTS.

FIELD OF THE INVENTION

The present invention relates to storage systems and, more specifically, to a storage system configured to generate read-only consistent "point-in-time" images of a storage element, such as an active file system.

BACKGROUND OF THE INVENTION

A storage system is a computer that provides storage service relating to the organization of information on writable persistent storage devices, such as memories, tapes or disks. The storage system is commonly deployed within a network attached storage (NAS) or storage area network (SAN) environment. A SAN is a high-speed network that enables establishment of direct connections between a storage system, such as an application server, and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media (i.e., network) adapted to operate with block access protocols, such as Small Computer Systems Interface (SCSI) protocol encapsulation over FC or Transmission Control Protocol/Internet Protocol (TCP/IP)/Ethernet.

SCSI is a peripheral input/output (I/O) interface with a standard, device independent protocol that allows different peripheral storage devices, such as disks, to attach to the storage system. In SCSI terminology, clients operating in a SAN environment are initiators that initiate requests and commands for data. The storage system is a target configured to respond to the requests issued by the initiators in accordance with a request/response protocol. The SAN clients typically identify and address the stored information in terms of blocks situated within target disks, or logical units thereof (also referred to within the industry as logical unit numbers or luns.

When used within a NAS environment, the storage system may be embodied as a file server including an operating system that implements a file system to logically organize the information as a hierarchical structure of directories and files on, e.g., the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, of a NAS system may be further configured to operate according to a client/server model of information delivery to thereby allow many client systems (clients) to access shared resources, such as files, stored on the filer. In the client/server model, the client may comprise an application executing on a computer that "connects" to the filer over a computer network, such as a point-to-point link, shared local area network, wide area network or virtual private network implemented over a public network, such as the Internet. The clients typically communicate with the filer by exchanging discrete frames or packets of data according to pre-defined protocols, such as the TCP/IP. NAS systems generally utilize file-based access protocols; therefore, each client may request the services of the filer by issuing file system protocol messages (in the form of packets) to the file system over the network.

A common type of file system is a "write in-place" file system, an example of which is the conventional Berkeley fast file system. In a write in-place file system, the locations of the data structures, such as modes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. An example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system residing on the filer.

The WAFL file system has the capability to generate a snapshot of its active file system. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. A PCPI can also include other information (metadata) about the active file system at the particular point in time for which the image is taken. The terms "PCPI" and "snapshot" may be used interchangeably through out this patent without derogation of Network Appliance's trademark rights.

A file system, such as the WAFL file system, supports multiple snapshots that are generally created on a regular schedule. Each snapshot is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various snapshots require extra storage blocks.

The multiple snapshots of a storage element are not independent copies, each consuming disk space; therefore, creation of a snapshot on the WAFL file system is instantaneous, since no entity data needs to be copied. Read-only accessibility denotes that a snapshot cannot be modified because it is closely coupled to a single writable image in the active file system. The closely coupled association between a file in the active file system and the same file in a snapshot obviates the use of multiple "same" files. In the example of a WAFL based file system, snapshots are described in TR3002 File System Design for a NFS File Server Appliance by David Hitz et al., published by Network Appliance, Inc. and in U.S. Pat. No. 5,819,292 entitled Method for Maintaining Consistent States of a File System and For Creating User-Accessible Read-Only Copies of a File System, by David Hitz et al., each of which is hereby incorporated by reference as though full set forth herein.

Broadly stated, a snapshot is stored on-disk along with the active file system, and is called into a memory of a filer as requested by an operating system. An exemplary file system inode structure 100 is shown in FIG. 1. The inode for an inode file 105 contains information describing the inode file associated with a file system. In this exemplary file system inode structure, the inode for the inode file 105 contains a pointer that references (points to) an inode file indirect block 110. The inode file indirect block 110 contains a set of pointers that reference inodes 117, which in turn contain pointers to indirect blocks 119. The indirect blocks 119 include pointers to file data blocks 120A, 120B and 120C. Each of the file data blocks 120(A-C) is capable of storing, e.g., 4 kilobytes (kB) of data. When the file system generates a snapshot of its active file system, a snapshot inode is generated as shown in FIG. 2. The snapshot inode 205 is, in essence, a duplicate copy of the inode for the inode file 105 of the file system 100 that shares common parts, such as inodes and blocks, with the active file system. For example, the exemplary file system structure 200 includes the inode file indirect blocks 110, inodes 117, indirect blocks 119 and file data blocks 120A-C as in FIG. 1

When a user modifies a file data block, the file system writes the new data block to disk and changes the active file system to point to the newly created block. FIG. 3 shows an exemplary inode file system structure 300 after a file data block has been modified. In this example, file data block 120C is modified to file data block 120C'. As a result, the contents of the modified file data block are written to a new location on disk as a function of the exemplary file system. Because of this new location, the indirect block 319 must be rewritten. Due to this changed indirect block 319, the inode 317 must be rewritten. Similarly, the inode file indirect block 310 and the inode for the inode file 305 must be rewritten.

Thus, after a file data block has been modified the snapshot inode 205 contains a pointer to the original inode file indirect block 110 which, in turn, contains pointers through the inode 117 and indirect block 119 to the original file data blocks 120A, 120B and 120C. The newly written indirect block 319 also includes pointers to unmodified file data blocks 120A and 120B. That is, the unmodified data blocks in the file of the active file system are shared with corresponding data blocks in the snapshot file, with only those blocks that have been modified in the active file system being different than those of the snapshot file.

However, the indirect block 319 further contains a pointer to the modified file data block 120C' representing the new arrangement of the active file system. A new inode for the inode file 305 is established representing the new structure 300. Note that metadata (not shown) stored in any snapshotted blocks (e.g., 205, 110, and 120C) protects these blocks from being recycled or overwritten until they are released from all snapshots. Thus, while the active file system inode for the inode file 305 points to new blocks 310, 317, 319, 120A, 120B and 120C', the old blocks 205, 110 and 120C are retained until the snapshot is fully released.

Snapshots provide a versatile feature that is essential for data recovery operations, such as backup and recovery of storage elements. However, since snapshots are read-only accessible and their contents cannot be modified, their use may be somewhat limited, particularly for operating systems and applications that do not have a notion of a read-only data store (file system) and that expect to write metadata at any time that the file system is accessible. When a storage element that is held in a snapshot is mapped to an initiator and contains the data for such a problematic file system, an issue arises in that the client attempts to write data to the read-only image. This is a fundamental issue in the design of a reliable system for backups. In general, once a backup image is made (via a mechanism like a snapshot), that image should be inviolate. Modifying a snapshot ("backup") image could have serious consequences in that the data of the snapshot may no longer be a "point-in-time" copy and a consistent image of the storage element data may no longer be available for subsequent recovery operations.

A prior approach to providing modifiable copies of a storage element uses conventional techniques to create mirrored copies of disks that may thereafter be "broken" (split) into separate copies and made visible to clients for different purposes, such as writable data stores. For example, assume a user (system administrator) creates a storage element, such as a database, on a database server and, through the use of conventional asynchronous/synchronous mirroring, creates a "mirror" of the database. By breaking the minor using conventional techniques, full disk-level copies of the database are formed. A client may thereafter independently write to each copy, such that the content of each "instance" of the database diverges in time.

One restriction associated with the prior approach, however, is that the number of formed mirrors limits the number of writable copies of the database. The present invention is directed to a technique that enables creation of multiple copies of a consistent storage element image with substantially no restrictions as to the number of writable copies that can be created.

SUMMARY OF THE INVENTION

The present invention overcomes the disadvantages of the prior art by providing a technique that enables creation and use of a writable, read-only snapshot of an active file system operating on a storage system, such as a multi-protocol storage appliance. The writable, read-only snapshot comprises a read-only "image" (file) residing in a snapshot and a writable virtual disk (vdisk) residing in the active file system. The writable vdisk is a "shadow" image of the snapshot file image and, as such, includes an attribute that specifies the snapshot file as a backing store.

In the illustrative embodiment, the multi-protocol storage appliance serves file and block protocol access to information stored on storage devices in an integrated manner for both network attached storage (NAS) and storage area network (SAN) deployments. A storage operating system of the appliance implements a virtualization system that includes the file system and that "virtualizes" the storage space provided by the devices. This virtualization system allows the file system to logically organize the information as named file, directory and vdisk storage objects to thereby provide an integrated NAS and SAN appliance approach to storage by enabling file-based access to the files and directories, while further enabling block-based access to the vdisks.

According to the novel technique, a write operation directed to the writable read-only snapshot is "trapped" such that the data associated with the operation is stored on the shadow, vdisk image in the active file system. In other words rather than directly accessing the read-only snapshot image of a logical unit number (lun), a client accesses the writable vdisk image, which provides a translucent view of the underlying read-only snapshot image. The writable vdisk is a sparse file containing only that data written by the client (e.g., an initiator in a SAN) to the read-only snapshot image subsequent to a snapshot operation to a volume underlying the lun (vdisk).

To the client, the data retrieved from the writable, read-only snapshot is always the latest data written. The client "sees" the writable vdisk data first (if it exists) and is served that data, the underlying read-only snapshot image being inaccessible for the range of valid data in the writable vdisk. Read-only data from the underlying snapshot image is delivered to the client when no valid data overlying the range exists in the writable vdisk. The underlying snapshot image is accessible and recoverable via a non-translucent path of directly accessing the snapshot image. By this technique, data integrity of a snapshotted lun or vdisk (as an inviolate backup) is preserved.

Advantageously, the inventive technique supports clients having a "weak" notion of a read-only file system, while preserving the integrity of a snapshot image of a lun. The novel writable read-only snapshot further provides the advantages of writability, in addition to "reliability-on-account-of-inviolability" features of snapshots. The writable read-only snapshot can be employed using any protocol, network file system or block storage.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
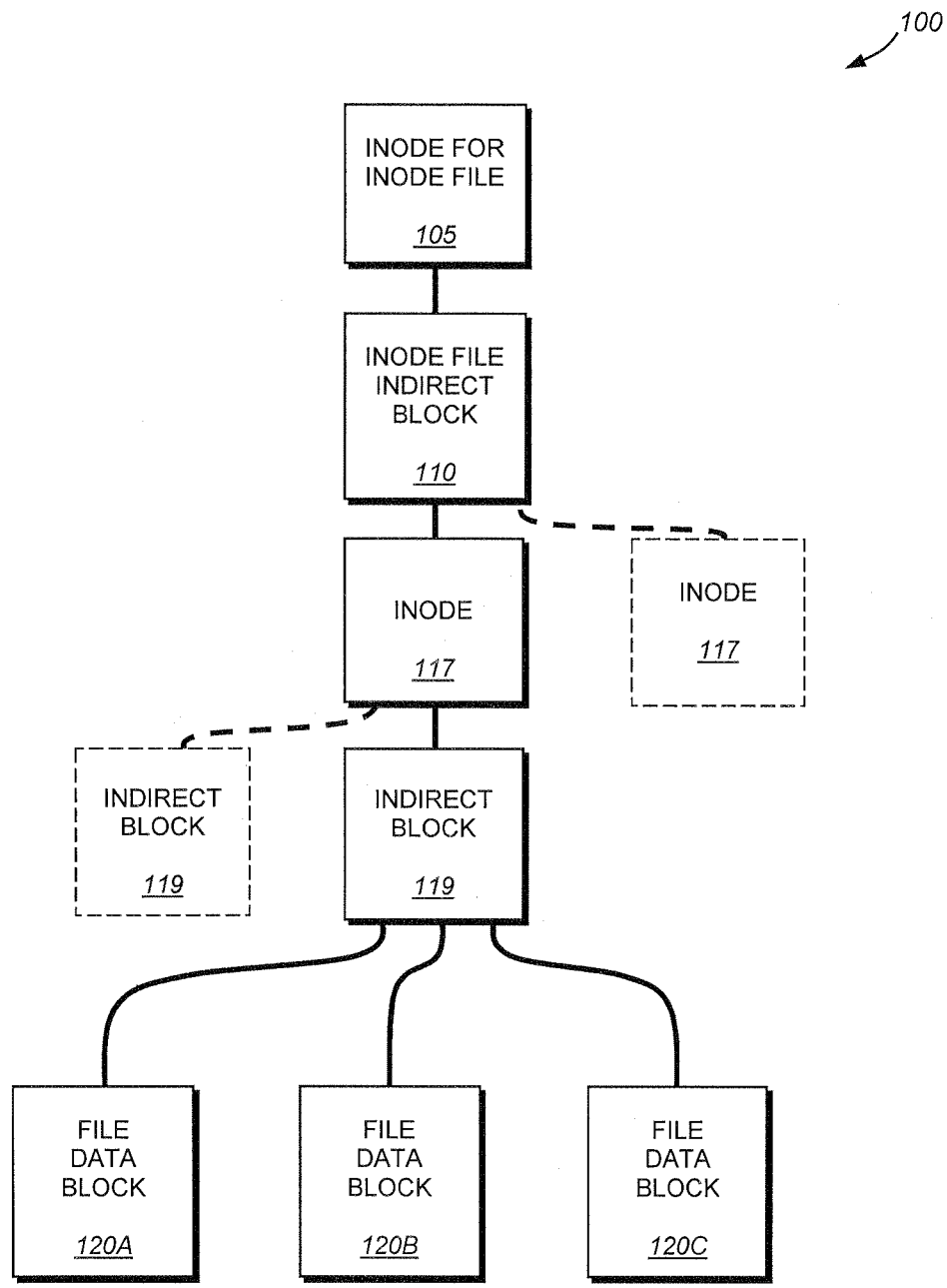
FIG. 1 is a schematic block diagram of an exemplary file system inode structure.
Figure 2:
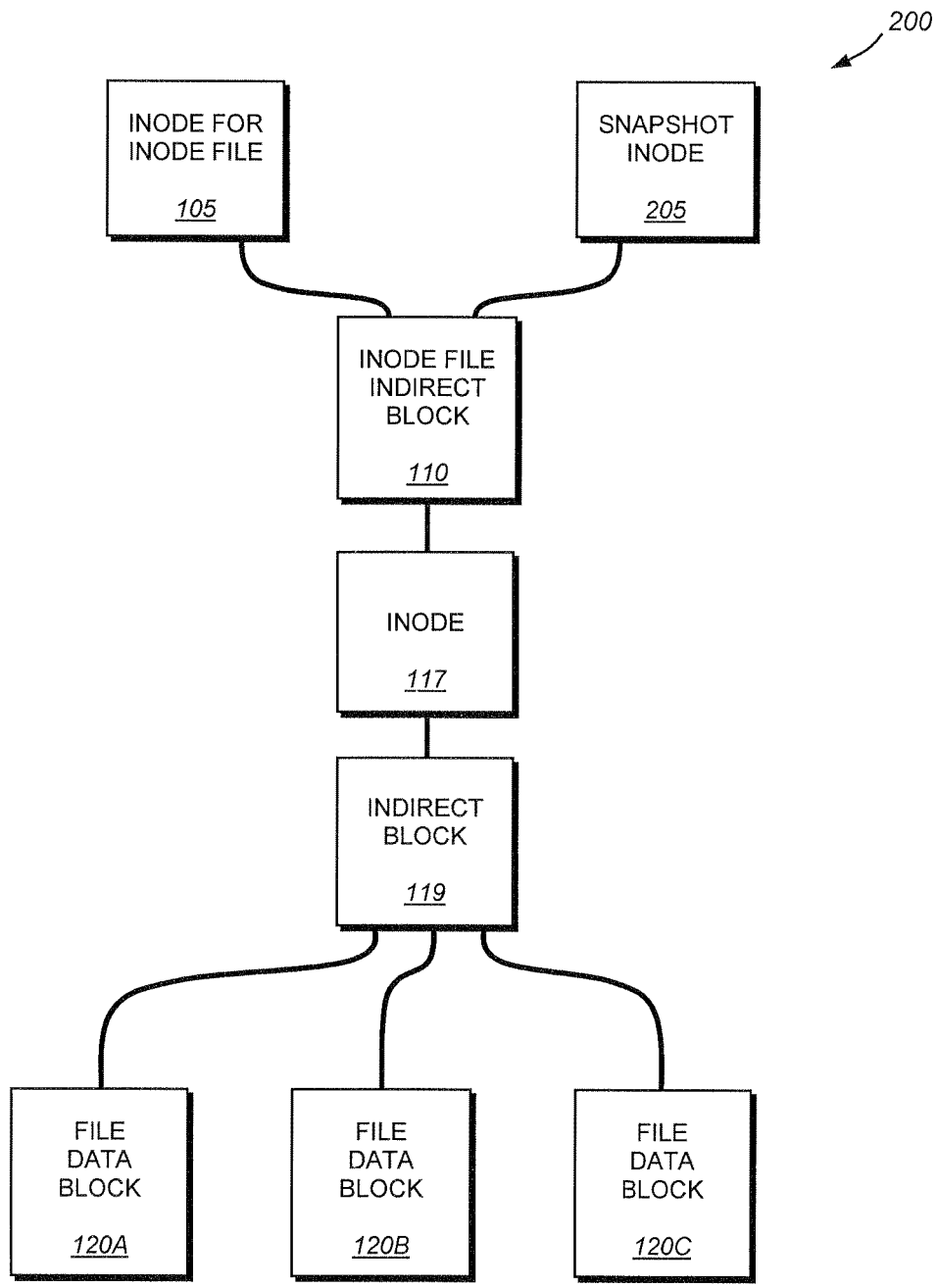
FIG. 2 is a schematic block diagram of the exemplary file system inode structure of FIG. 1 including a snapshot inode.
Figure 3:
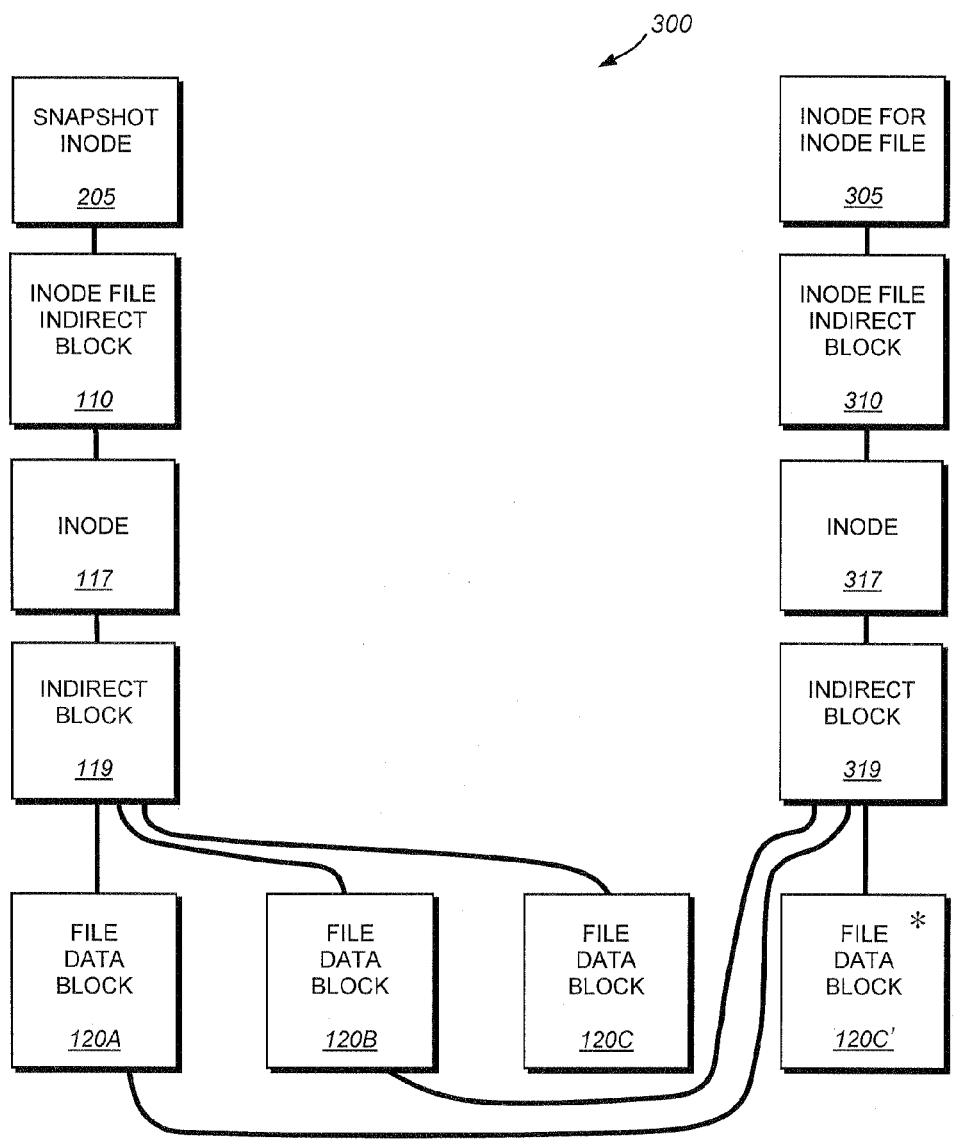
FIG. 3 is a schematic block diagram of an exemplary file system inode structure of FIG. 2 after a data block has been rewritten.
Figure 4:
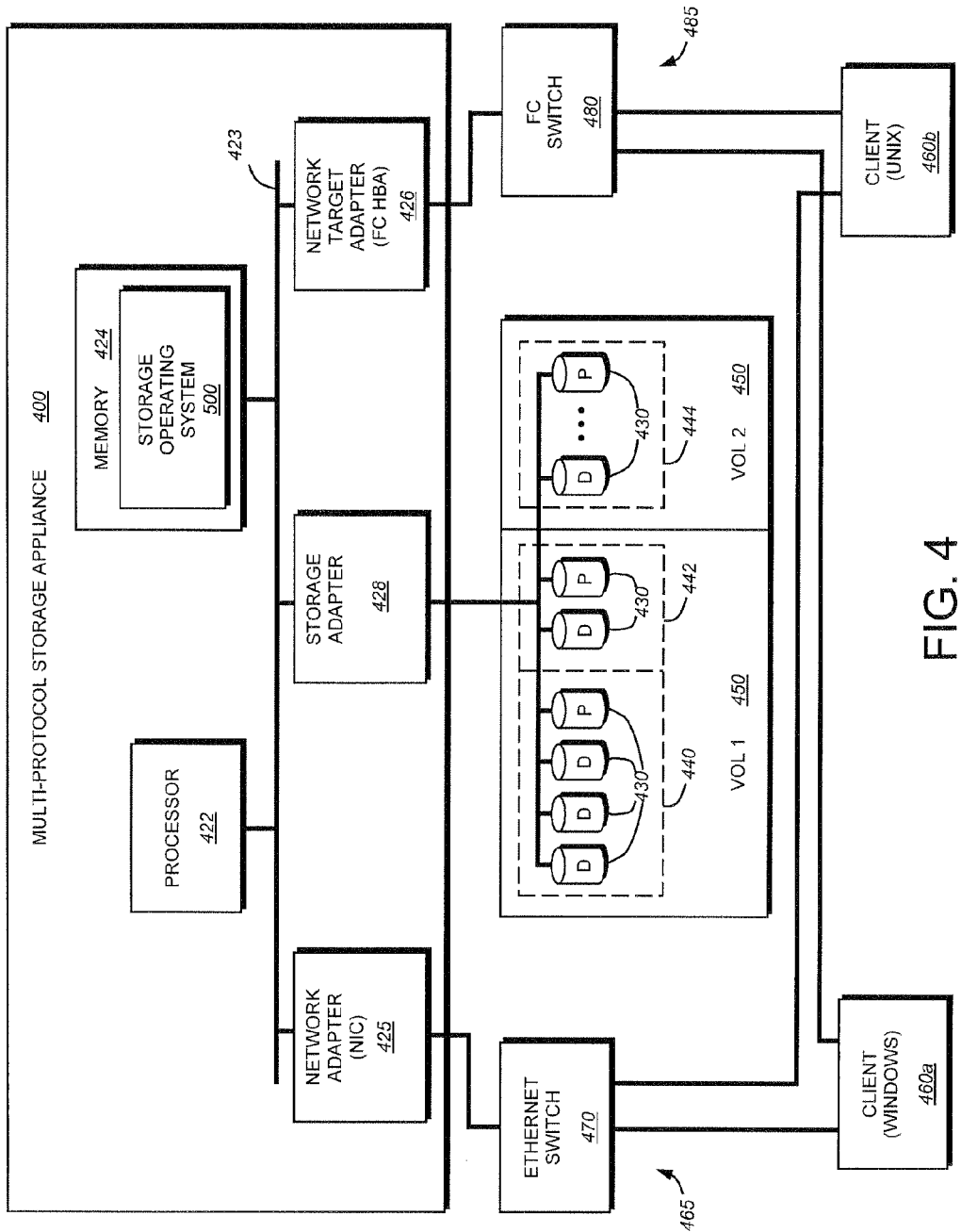
FIG. 4 is a schematic block diagram of a multi-protocol storage appliance that may be advantageously used with the present invention.

FIG. 4 is a schematic block diagram of a multi-protocol storage appliance 400 that may be advantageously used with the present invention. The multi-protocol storage appliance is configured to provide storage service for both file and block protocol access to information stored on storage devices in an integrated manner. In this context, the integrated multi-protocol appliance denotes a computer having features such as simplicity of storage service management and ease of storage reconfiguration, including reusable storage space, for users (system administrators) and clients of network attached storage (NAS) and storage area network (SAN) deployments.

The multi-protocol storage appliance 400 is illustratively embodied as a storage system comprising a processor 422, a memory 424, a plurality of network adapters 425, 426 and a storage adapter 428 interconnected by a system bus 423. The multi-protocol storage appliance 400 also includes a storage operating system 500 that provides a virtualization system (and, in particular, a file system) to logically organize the information as a hierarchical structure of named directory, file and virtual disk (vdisk) storage objects on the disks 430. An example of a multi-protocol storage appliance that may be advantageously used with the present invention is described in commonly assigned U.S. Pat. No. 7,873,700, issued on Jan. 18, 2011, titled A Multi-Protocol Storage Appliance that Provides Integrated Support for File and Block Access Protocols, by Brian Pawlowski, et al., which is hereby incorporated by reference as though fully set forth herein.

Whereas clients of a NAS-based network environment have a storage viewpoint of files within volumes, the clients of a SAN-based network environment have a storage viewpoint of blocks within disks. To that end, the multi-protocol storage appliance 400 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports.

In the illustrative embodiment, the memory 424 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 500, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 425 couples the storage appliance to a plurality of clients 460a,b over point-to-point links, wide area networks, virtual private networks implemented over a public network (Internet) or a shared local area network, hereinafter referred to as an illustrative Ethernet network 465. For this NAS-based network environment, the clients are configured to access information stored on the multi-protocol appliance as files. Therefore, the network adapter 425 may comprise a network interface card (NIC) having the mechanical, electrical and signaling circuitry needed to connect the appliance to a network switch, such as a conventional Ethernet switch 470. The clients 460 communicate with the storage appliance over network 465 by exchanging discrete frames or packets of data according to pre-defined protocols, such as the Transmission Control Protocol/Internet Protocol (TCP/IP).

The clients 460 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 460 may request the services of the storage appliance 400 by issuing file access protocol messages (in the form of packets) to the appliance over the network 465. For example, a client 460*a* running the Windows operating system may communicate with the storage appliance 400 using the Common Internet File System (CIFS) protocol over TCP/IP. On the other hand, a client 460*b* running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 426 also couples the multi-protocol storage appliance 400 to clients 460 that may be further configured to access the stored information as blocks or disks. For this SAN-based network environment, the storage appliance is coupled to an illustrative Fibre Channel (FC) network 485. FC is a networking standard describing a suite of protocols and media that is primarily found in SAN deployments. The network target adapter 426 may comprise a FC host bus adapter (HBA) having the mechanical, electrical and signaling circuitry needed to connect the appliance 400 to a SAN network switch, such as a conventional FC switch 480. In addition to providing FC access, the FC HBA offloads fiber channel network processing operations for the storage appliance.

The clients 460 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 430, to attach to the storage appliance 400. In SCSI terminology, clients 460 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 400 supports various SCSI-based protocols used in SAN deployments, including SCSI encapsulated over TCP (iSCSI) and SCSI encapsulated over FC (FCP). The initiators (hereinafter clients 460) may thus request the services of the target (hereinafter storage appliance 400) by issuing iSCSI and FCP messages over the network 485 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 428 cooperates with the storage operating system 500 executing on the storage appliance to access information requested by the clients. The information may be stored on the disks 430 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 422 (or the adapter 428 itself) prior to being forwarded over the system bus 423 to the network adapters 425, 426, where the information is formatted into packets or messages and returned to the clients.

Storage of information on the appliance 400 is preferably implemented as one or more storage volumes (e.g., VOL1-2 450) that comprise a cluster of physical storage disks 430, defining an overall logical arrangement of disk space. Each volume may be associated with its own file system and, for purposes herein, volume and file system may be used synonymously. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 450 is constructed from an array of physical disks 430 that are organized as RAID groups 440, 442, and 444. The physical disks of each RAID is group include those disks configured to store striped data (D) and those configured to store parity (P) for the data, in accordance with an illustrative RAID 4 level configuration. However, other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

To facilitate access to the disks 430, the storage operating system 500 implements a write-anywhere file system that cooperates with virtualization modules to provide a function that "virtualizes" the storage space provided by disks 430. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the is Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 5:
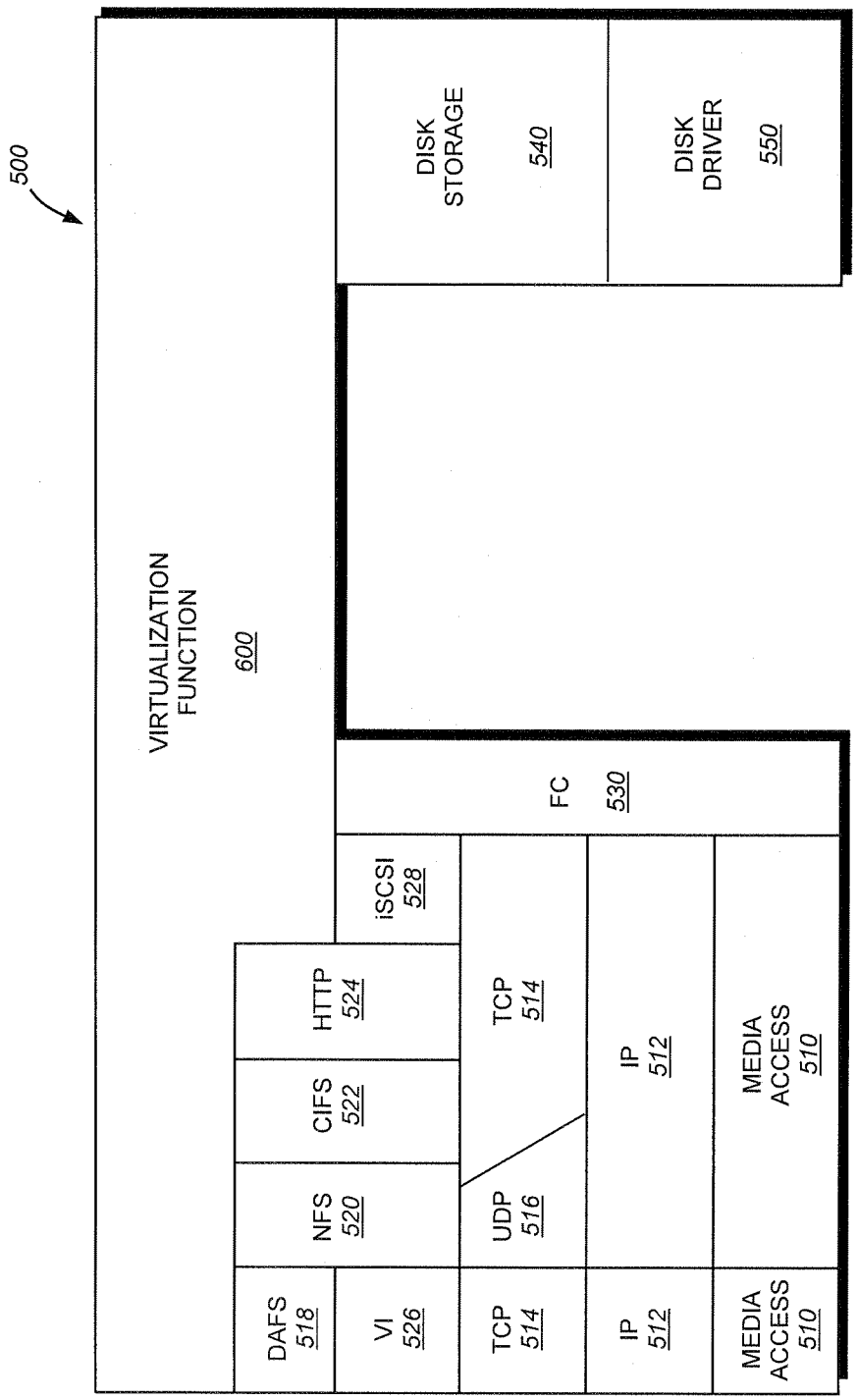
FIG. 5 is a schematic block diagram of a storage operating system of the multi-protocol storage appliance that may be advantageously used with the present invention.

FIG. 5 is a schematic block diagram of the storage operating system 500 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 510 of network drivers (e.g., gigabit Ethernet drivers) that interfaces to network protocol layers, such as the IP layer 512 and its supporting transport mechanisms, the TCP layer 514 and the User Datagram Protocol (UDP) layer 516. A file system protocol layer provides multi-protocol file access and, to that end, includes support for the DAFS protocol 518, the NFS protocol 520, the CIFS protocol 522 and the Hypertext Transfer Protocol (HTTP) protocol 524. A VI layer 526 implements the VI architecture to provide direct access transport (DAT) capabilities, such as RDMA, as required by the DAFS protocol 518.

An iSCSI driver layer 528 provides block protocol access over the TCP/IP network protocol layers, while a FC driver layer 530 operates with the FC HBA 426 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 540 that implements a disk storage protocol, such as a RAID protocol, and a disk driver layer 550 that implements a disk access protocol such as, e.g., a SCSI protocol.

Figure 6:
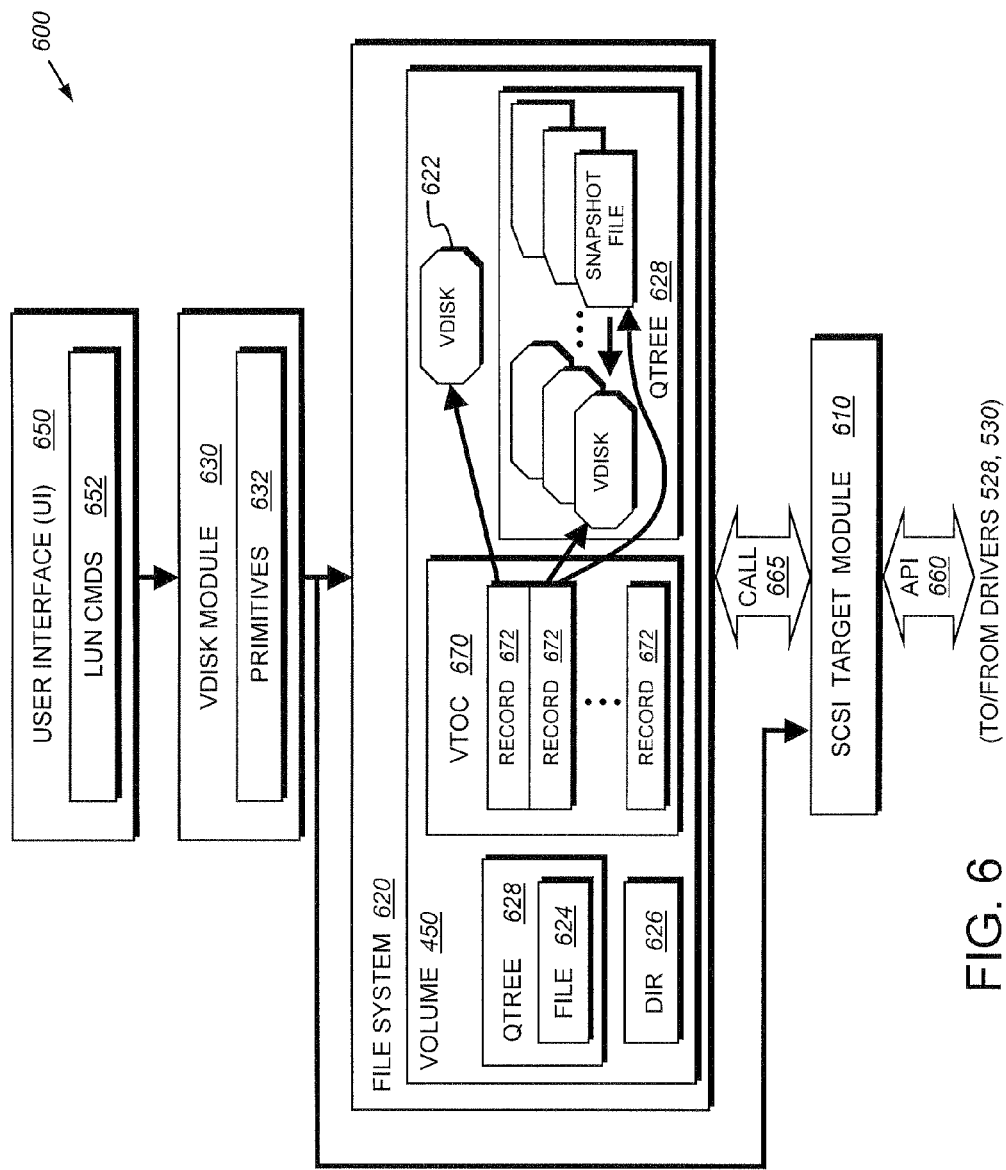
FIG. 6 is a schematic block diagram of a virtualization system that is implemented by a file system interacting with virtualization modules of the storage operating system.

Bridging the disk software layers with the integrated network protocol stack layers is a virtualization system 600. FIG. 6 is a schematic block diagram of the virtualization system 600 that is implemented by a file system 620 interacting with virtualization modules illustratively embodied as, e.g., vdisk module 630 and SCSI target module 610. It should be noted that the vdisk module 630, the file system 620 and SCSI target module 610 can be implemented in software, hardware, firmware, or a combination thereof. The vdisk module 630 is layered on the file system 620 to enable access by administrative interfaces, such as a streamlined user interface (UI 650), in response to a system administrator issuing commands to the multi-protocol storage appliance 400. In essence, the vdisk module 630 manages SAN deployments by, among other things, implementing a comprehensive set of vdisk (lun) commands (cmds) 652 issued through the UI 650 by a system administrator. These vdisk commands are converted to primitive file system operations ("primitives 632") that interact with the file system 620 and the SCSI target module 610 to implement the vdisks.

The SCSI target module 610, in turn, initiates emulation of a disk or lun by providing a mapping procedure that translates a lun identifier to a vdisk-type file. The SCSI target module is illustratively disposed between the FC and iSCSI drivers 528, 530 and the file system 620 to thereby provide a translation layer of the virtualization system 600 between the SAN block (lun) space and the file system space, where luns are represented as vdisks 622. To that end, the SCSI target module has a set of application programming interfaces (APIs 660) that are based on the SCSI protocol and that enable a consistent interface to both the iSCSI and FCP drivers 528, 530. By "disposing" SAN virtualization over the file system 620, the multi-protocol storage appliance reverses the approach taken by prior systems to thereby provide a single unified storage platform for essentially all storage access protocols.

The file system 620 is illustratively a message-based system; as such, the SCSI target module 610 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. Alternatively, the generated message may include an operation type and file handle containing volume/inode information. The SCSI target module 610 passes the message into the file system layer 620 as, e.g., a function call 665, where the operation is performed.

The file system provides volume management capabilities for use in block-based access to the information stored on the storage devices, such as disks. That is, in addition to providing file system semantics, such as naming of storage objects, the file system 620 provides functions normally associated with a volume manager. These functions include (i) aggregation of the disks, (ii) aggregation of storage bandwidth of the disks, and (iii) reliability guarantees, such as mirroring and/or parity (RAID), to thereby present one or more storage objects layered on the file system. A feature of the multi-protocol storage appliance is the simplicity of use associated with these volume management capabilities, particularly when used in SAN deployments.

The file system 620 illustratively implements the WAFL file system having an on-disk format representation that is block-based using, e.g., 4 kilobyte (kB) blocks and using inodes to describe the files 624. The file system uses files to store metadata describing the layout of its file system; these metadata files include, among others, an inode file. A file handle, i.e., an identifier that includes an inode number, is used to retrieve an inode from disk. As noted, the WAFL file system also supports multiple snapshots that are generally created on a regular schedule. A description of the structure of the file system, including on-disk inodes, the inode file and snapshots, is provided in U.S. Pat. No. 5,819,292. Notably, snapshots are created on the multi-protocol storage appliance without the need for prior configuration of the underlying storage. This feature of the appliance simplifies the creation and management of data recovery techniques for business continuance compared to previous block-based recovery methods and mechanisms.

Figure 7:
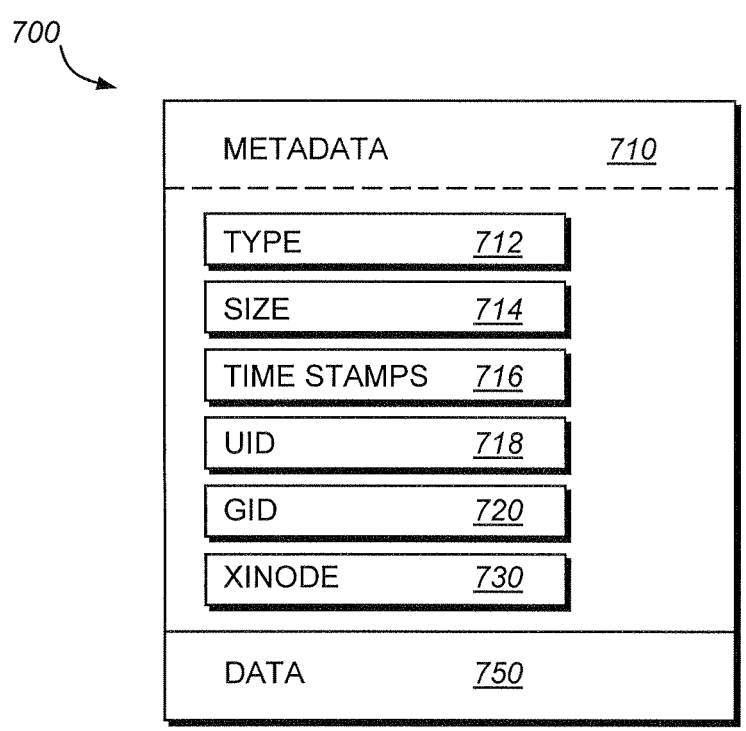
FIG. 7 is a schematic block diagram of an on-disk inode data structure that may be advantageously used with the present invention.

FIG. 7 is a schematic block diagram illustrating an on-disk inode 700, which includes a metadata section 710 and a data section 750. The information stored in the metadata section 710 of each inode 700 describes the file and, as such, includes the type (e.g., regular, directory) 712 of file, the size 714 of the file, time stamps (e.g., access and/or modification) 716 for the file and ownership, i.e., user identifier (UID 718) and group ID (GID 720), of the file. The metadata section 710 further includes a xinode field 730 containing a pointer that references another on-disk inode structure containing, e.g., access control list (ACL) information associated with the file or directory. The contents of the data section 750 of each inode, however, may be interpreted differently depending upon the type of file (inode) defined within the type field 712. For example, the data section 750 of a directory inode contains metadata controlled by the file system, whereas the data section of a regular inode contains user-defined data. In this latter case, the data section 750 includes a representation of the data associated with the file.

Specifically, the data section 750 of a regular on-disk inode may include user data or pointers, the latter referencing 4 kB data blocks on disk used to store the user data. Each pointer is preferably a logical volume block number (VBN) to thereby facilitate efficiency among the file system and the disk storage (RAID) layer 540 when accessing the data on disks. Given the restricted size (128 bytes) of the inode, user data having a size that is less than or equal to 64 bytes is represented, in its entirety, within the data section of that inode. However, if the user data is greater than 64 bytes but less than or equal to 64 kB, then the data section of the inode comprises up to 16 pointers, each of which references a 4 kB block of data on the disk. Moreover, if the size of the data is greater than 64 kilobytes but less than or equal to 64 megabytes (MB), then each pointer in the data section 750 of the inode references an indirect inode that contains 1024 pointers, each of is which references a 4 kB data block on disk. Each data block is loaded from disk 430 into memory 424 in order to access the data. In addition, the size field 714 of the metadata section 710 of the inode refers to the size of the file.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance via, e.g. a user interface (UI) as a special typed file (object). Illustratively, the vdisk is a multi-inode object comprising a special file inode that holds data and at least one associated stream inode that holds attributes. The special file inode functions as a main container for storm ing data, such as application data, associated with the emulated disk. The stream inode stores attributes that, among others, allow luns and exports to persist over, e.g., reboot operations, while also enabling management of the vdisk as a single disk object in relation to SAN clients.

Figure 8:
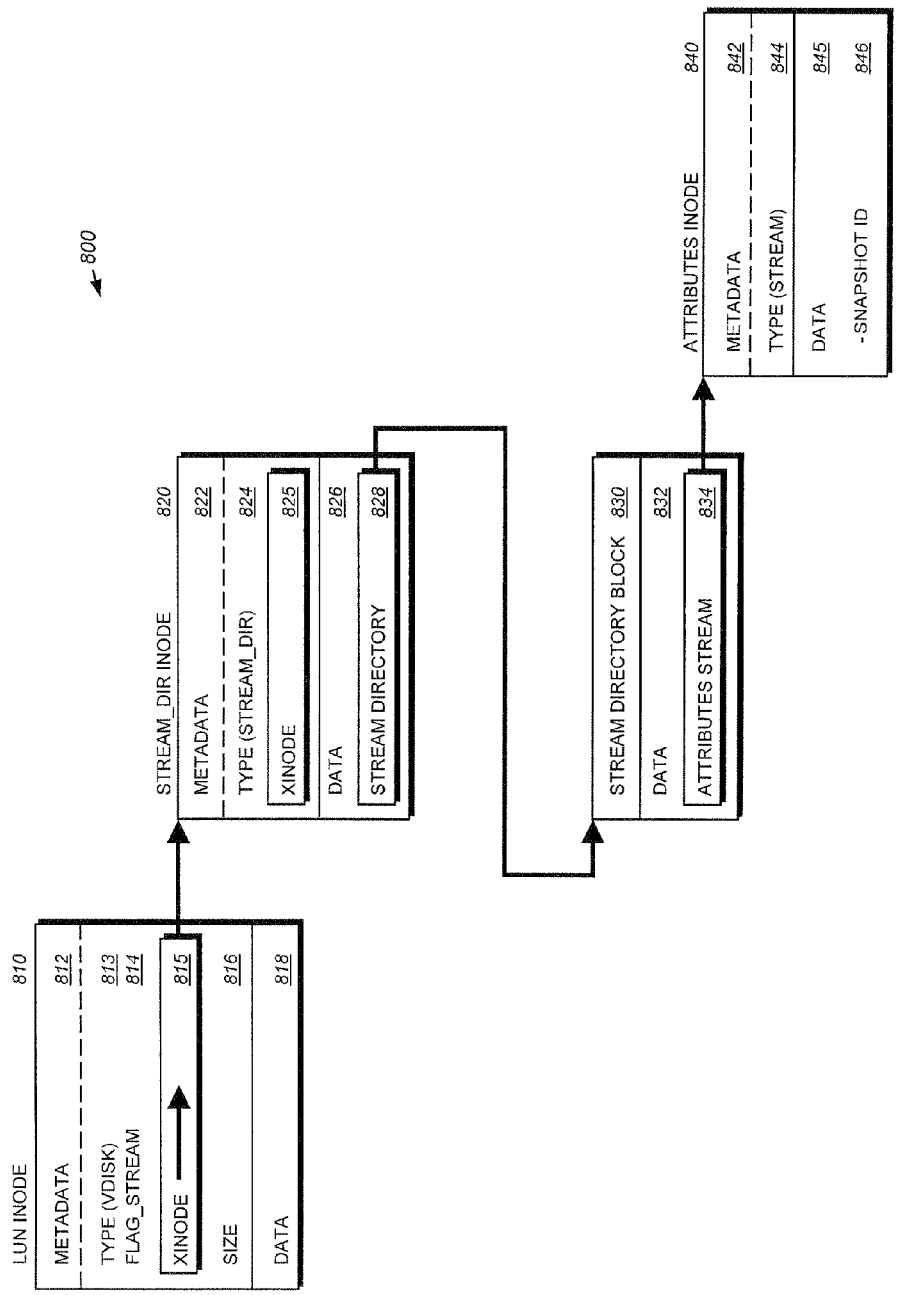
FIG. 8 is a schematic block diagram illustrating an on-disk representation of virtual disk (vdisk) inode data structures, including logical unit number (lun) and attributes inodes, that may be advantageously used with the present invention.

FIG. 8 is a schematic block diagram illustrating an on-disk representation of vdisk inode data structures 800, including a lun inode 810 and an attributes inode 840. The lun inode 810 is the special file inode that functions as a main container for storing data associated with the vdisk 622. That is, the lun inode comprises a data section 818 that may store the actual (user or application) data or pointers referencing 4 kB data blocks on disk used to store the data, as described in FIG. 7. The data stored in this "default" container can be retrieved (read) and stored (written) by a client using conventional block access protocols, such as the SCSI protocol. When appropriately configured, a vdisk may also be accessed using conventional file-level access protocols, such as the NFS protocol. In this configuration, a vdisk "appears" to be a regular file for such accesses. The lun inode 810 also comprises a metadata section 812 containing metadata such as the type 813 (i.e., a special vdisk type) and size 816 of the vdisk that, upon creation of the inode, is zero. A flag_stream flag 814 identifies the lun inode 810 as having not only a default data container section 818 but also one or more stream "sections", as provided by stream_dir inode 820.

In order to access the stream_dir inode 820, the pointer of xinode field 815 in lun inode 810 is modified to reference the inode 820. The stream_dir inode 820 comprises a metadata section 822 that includes a type (stream_dir) field 824 and an xinode field 825 that references another on-disk inode structure containing, e.g., access control (such as CIFS permission) information associated with the vdisk. The inode 820 also includes a data section 826 containing a pointer 828 that references a stream directory data block associated with the vdisk, such as stream directory block 830. The stream directory block 830 comprises a data section 832 that includes a plurality of entries, each containing an external representation of a stream inode along with mapping information (i.e., the inode number) for that inode. One of those entries, entry 834, contains mapping information (e.g., a pointer) that references an attributes (stream) inode 840.

The attributes inode 840 comprises a metadata section 842 that includes a type (stream) field 844 and a data section 845 that functions as a persistent store for holding various named attributes associated with the vdisk 622. Attributes are an implementation mechanism that is internal to the file system and not managed by users. An example of an attribute is a snapshot file handle 846 or file handle of a "backing store" file (i.e., the snapshot file). The snapshot file handle 846 includes a snapshot identifier (ID), which is an identifier (pointer) to a snapshot containing the snapshot file, and a file ID, which is an identifier (pointer) to the snapshot file. As described herein, the snapshot file functions as a backing store for the vdisk when the vdisk is used as a writable, read-only snapshot in accordance with the present invention. The vdisk and its associated inodes are further described in commonly assigned U.S. Pat. No. 7,107,385, issued on Sep. 12, 2006 titled STORAGE VIRTUALIZATION BY LAYERING VIR- TUAL DISK OBJECTS ON A FILE SYSTEM, by Vijayan Rajan, et al., which is hereby incorporated by reference as though fully set forth herein.

Referring again to FIG. 6, the file system implements access operations to vdisks 622, as well as to files 624 and directories (dir 626) that coexist with respect to global space management of units of storage, such as volumes 450 and/or qtrees 628. A qtree 628 is a special directory that has the properties of a logical sub-volume within the namespace of a physical volume. Each file system storage object (file, directory or vdisk) is associated with one qtree, and quotas, security properties and other items can be assigned on a per-qtree basis. The vdisks and files/directories may be layered on top of qtrees 628 that, in turn, are layered on top of volumes 450 as abstracted by the file system "virtualization" layer 620.

While vdisks are self-contained objects containing all data necessary for proper operation and authorization, a vdisk table of contents (VTOC 670) is provided as a performance enhancement to finding and loading vdisks. The VTOC is not necessary for correct operation and can be reconstructed dynamically by a scan of the vdisks. The VTOC 670 is a per-volume data structure that is stored in a metadata file and that is used to optimize location determination and initialization of persistent vdisks 622 in a volume 450. In addition, the VTOC 670 facilitates resolution of the location of a file within a particular snapshot, i.e., allows efficient resolution of a snapshot file location.

The VTOC 670 comprises one or more records 672, wherein each record includes flags and file entries that can be dynamically recreated from information stored in the encapsulated vdisk storage objects. The file entries, in turn, include an entry pertaining to a vdisk in the active file system and an entry pertaining to a backing store (snapshot file), if the vdisk is used as a writable, read-only snapshot. In particular, the file entries of each record 672 contain information such as (i) a file ID (inode number) of the vdisk on the volume, (ii) generation number of the vdisk (lun) inode; (iii) file handle, including snapshot ID (only valid for the backing store entry), of the backing store file, and (iv) directory information. The directory information comprises a file block number in a parent directory (qtree root) containing an entry for the vdisk, along with an index of directory entries in a parent directory block. The directory entry enables determination of the last component of a path to the snapshot file.

In the illustrative embodiment, the granularity of a snapshot is a file system; however, the principles of the present invention apply to snapshot granularities of a file and a vdisk. Since a snapshot is a read-only entity, a file that resides in the snapshot is a read-only file. As noted, some operating systems and applications do not support the notion of a read-only data store. For example, the Windows operating system does not support mounting of a read-only (file system) disk. Therefore, it is desirable to enable a read-only storage entity (such as a snapshot file) to be "writable."

The present invention relates to a technique that enables creation and use of, including access to, a writable, read-only snapshot of the active file system on the multi-protocol storage appliance. The writable, read-only snapshot comprises a read-only "image" (file) residing in a snapshot and a writable vdisk residing in the active file system. The writable vdisk is a "shadow" image of the snapshot file image and, as noted, includes an attribute that specifies the snapshot file as a backing store. It should be noted that while there are any vdisks in existence in the active file system specifying a file in a snapshot, the snapshot file is "locked" and cannot be deleted.

According to the novel technique, a write operation directed to the writable read-only snapshot is "trapped" (directed) to the vdisk in the active file system such that the data associated with the operation is stored on that shadow, vdisk image. In other words rather than directly accessing the read-only snapshot image of a lun, a client accesses the writable vdisk image, which provides a translucent view of the underlying read-only snapshot image. The writable vdisk is a "sparse" file containing only that data written by the client (e.g., an initiator in a SAN) to the read-only snapshot image subsequent to a snapshot operation to a volume underlying the lun (vdisk).

Briefly, the sparse vdisk in the active file system is "translucent", i.e., initially the vdisk has a size equal to the size of the snapshot file because there is no data other than the snapshot file data. Since there is no data in the initial instance of the vdisk, the vdisk is completely filled with "holes." On read operations issued by a client to the writable read-only snapshot, the file system 620 searches for the requested block in the vdisk of the active file system. If the block is not found, the corresponding block from the backing snapshot file is accessed and returned. It should be noted that having writable vdisks backed by a snapshot file does not prevent direct access to the snapshot file (for backup or other reasons).

Write operations are only carried out on the sparse vdisk in the active file system, i.e., the vdisk in the active file system stores changes (write data) to the read-only snapshot file. For subsequent read operations directed to the writable read-only snapshot, any modified/changed ("written") data blocks are returned. Otherwise, the holes in the vdisk result in copies of the read-only data blocks being returned from the associated snapshot file, thereby providing a "space conservative" storage entity.

For example, assume that a vdisk exists in its original state in the active file system and a snapshot is subsequently taken of the volume underlying that vdisk. Write operations can then be directed to that snapshotted vdisk in accordance with the inventive writable read-only snapshot technique. To that end, the writable read-only snapshot storage entity may be thought of as comprising two storage space layers: (i) an underlying snapshot layer that is "frozen in time" and that does not change periodically as long as the snapshot file exists, and (ii) an overlaying vdisk layer of the active file system that does change in time as data is written to that layer.

Figure 9:
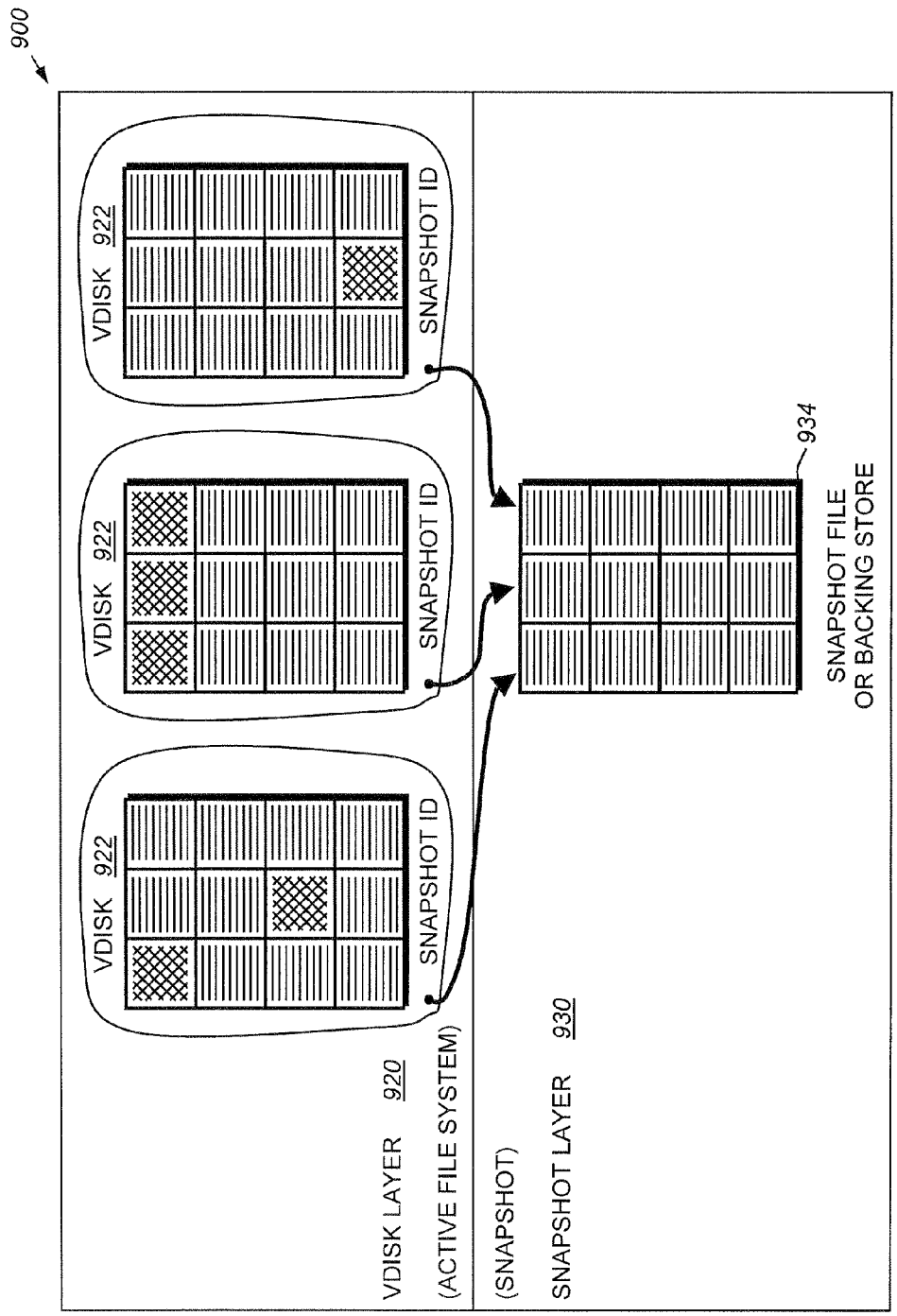
FIG. 9 is a schematic block diagram illustrating a plurality of writable read-only snapshots according to the present invention.

FIG. 9 is a schematic block diagram illustrating a plurality of writable read-only snapshots 900 according to the present invention. An upper, overlaying vdisk layer 920 comprises a plurality of vdisk storage objects 922 in the active file system, each vdisk 922 backed by a file 934 in an underlying snapshot layer 930 and each of which is different from the underlying snapshot file 934. That is, none of the vdisks in the active file system are the same files as the snapshot file. There could be another file (e.g., the same file) having the same properties and association with the snapshot file as dictated by the conventional snapshot mechanism. Alternatively, the same file in the active file system may be deleted without impacting the existence of the snapshot file. Notably, each novel writable read-only snapshot storage entity 900 functions through the vdisk layer 920 and its association with the underlying read-only snapshot file layer 930 as provided by a snapshot file handle 846.

The writable vdisk layer is thus associated with the read-only snapshotted (file) version of the original vdisk. Modifications (write data) may be subsequently directed to the vdisk layer with new disk blocks being allocated to accommodate those modifications, while unmodified blocks of the vdisk layer are shared through the vdisk and underlying read-only snapshot layer. As a result, there may be various "planes" of snapshots with various degrees of sharing as the active file system migrates towards subsequent modifications. For example, yet another subsequent snapshot will reflect those changes made to the vdisk layer.

In accordance with the inventive technique, however, a (special) file in the active file system that is the same (special) file in the snapshot need not exist, i.e., may be deleted. That is, even though the (special) file inode in the active file system is deleted, the corresponding snapshot file inode may be accessed by way of an attribute stored within the vdisk structure. The encapsulation property of a vdisk enables association of a snapshot file inode with the vdisk (lun) inode. Additionally, the backing file need not be the same file as that stored in the active file system. Using the teachings described herein, any backing file may be utilized. Thus, as described in reference to FIG. 9 below, multiple files in the active file system may be associated with the same backing file. This association is manifested as a file handle of the snapshot file, including an indication of the particular snapshot within which the file resides. This association is written into and stored in the attribute inode 840 of the vdisk as a snapshot file handle attribute 846.

In the illustrative embodiment, a writable, read-only snapshot 900 is created by identifying (and associating) a snapshot file 934 in a particular snapshot with a vdisk 922 created in the file system 620 via a "lun create" command. The lun create command provides a human readable form for a user (system administrator) to specify a particular file in a snapshot that will be bound (associated) with a newly created vdisk. An example of such a lun create command is:

lun create-b/vol/vol0/.snapshot/hourly.0/x/vol/vol0/y

Specifically, the lun create command includes a path descriptor (/vol/vol0/) to a named file (x) in a snapshot (snapshot/hourly.0/) and essentially binds that named snapshot file as a backing store to a newly created vdisk. A new writable snapshot lun path (/vol/vol0/y/) also needs to be specified. Whereas the user interface uses names of the snapshot file and the vdisk to create the association between those two layers, internally (within the file system) a file handle associated with the snapshot file is used to create the association. Note that in this context the file handle includes, among other things, the snapshot ID of the particular snapshot.

Therefore, the vdisk layer 920 may include multiple vdisk images 922, each of which is backed by a common snapshot file 934 in a particular snapshot (layer) 930. Each vdisk image 922 may be written (modified) independently, as denoted by different data blocks being modified in each of the vdisks. For example, all data blocks with horizontal lines are shared between an instance of the (special) file in the active file system and an instance of the same file in the snapshot. Here, the VBNs point to, i.e., reference, the same data block when those blocks are shared between the instances of the active and snapshot file. In contrast, those data blocks in the active file system with hash marks indicate blocks that have been modified since the snapshot was taken; consequently, those blocks are not shared with the instance of the file in the snapshot and are allocated new VBN blocks. In sum, each of the modified data blocks in each of the vdisks represents a newly allocated data block, whereas the unmodified data blocks of the vdisks are shared with corresponding data blocks in the snapshot file (backing store).

Each vdisk of the writable, read-only snapshot 900 initially has the same content because it has no content of its own; that is, the writable vdisks 922 initially obtain all of their content from the snapshot backing store file 934. Notably, however, each vdisk 922 is not a copy of each other and all unmodified data is shared between the vdisks and the read-only snapshot file. Because there is no copying involved, a feature of the present invention is instantaneous creation of a writable snapshot despite the size (largeness) of the vdisk. In addition, because all unmodified data is shared between a writable vdisk 922 and the read-only backing store 934, the writable snapshot entity is space conservative and space efficient.

Use of a vdisk inode structure for implementing a writable read-only snapshot allows the ability to store state (e.g., the snapshot file handle 846) within the attributes inode 840 of the vdisk, which state is needed to identify the snapshot containing the backing store (file in the snapshot). By implementing the writable read-only snapshot technique in the context of a vdisk structure (which is not a file), that structure can efficiently facilitate creation of the binding needed between the "shadow" copy (vdisk 922) and the original copy (snapshot file 934). The snapshot file handle "pointer" to the snapshot file inode effectively "locks" the snapshot file inode against deletion until there are no longer any vdisks in existence in the active file system that reference (point to) that snapshot file inode.

Figure 10:
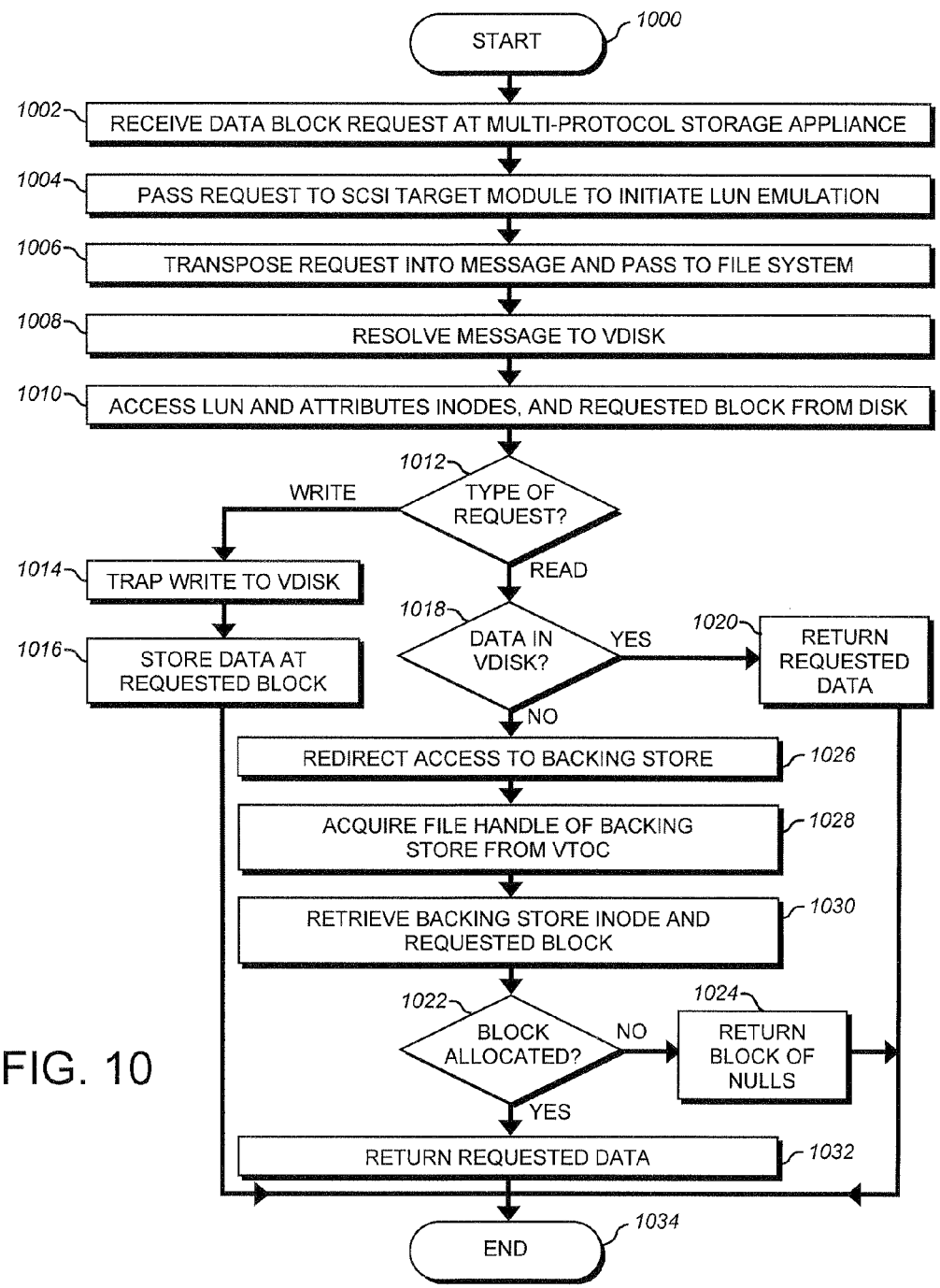
FIG. 10 is a flowchart illustrating a sequence of steps involved with accessing the writable, read-only snapshot in accordance with the present invention.

FIG. 10 is a flowchart illustrating a sequence of steps involved with accessing the writable, read-only snapshot in accordance with the present invention. The sequence starts at Step 1000 and proceeds to Step 1002 where a client issues a SCSI data block request directed to the writable, read-only snapshot and that request is received at the storage appliance 400 over a SCSI-based protocol, e.g., iSCSI or FCP. At Step 1004, the request is passed up the integrated network protocol stack to the virtualization system 600, where the SCSI target module 610 processes it to initiate emulation of a lun corresponding to a vdisk. Specifically, the SCSI target module maps SCSI blocks specified in the request to vdisk blocks and handles formatting of the request, along with dynamic placement of the vdisk.

At Step 1006, the SCSI target module transposes the SCSI request into a message and passes it to the file system 620, wherein the message illustratively includes an operation (read or write) and a file handle containing volume/inode information. The file system 620 resolves that message to the vdisk at Step 1008 by, e.g., mapping the file handle to inode structures to obtain a lun inode 810 representative of the vdisk in the active file system. The file system then accesses the requested data block(s) by converting the lun inode file handle to an inode number and indexing into the inode file using the inode number to retrieve a VBN representative of the requested block. Specifically, at Step 1010, the inode number and VBN are used to access/retrieve (from disk) the lun inode 810, attributes inode 840 and requested data block from disk 430, which are then loaded into memory (in-core).

At Step 1012, the type of operation requested in the message determines the action taken by the file system 620. If the requested operation is a write request, the write operation is trapped to the writable vdisk 922 at Step 1014 and the (write) data associated with the write operation is stored at a requested block (VBN) associated with the vdisk in the active file system at Step 1016. The sequence then ends at Step 1034. If the requested operation is a read request, a determination is made at Step 1018 as to whether the requested (read) data is present (stored) in the writable vdisk. If so, the requested (read) data is returned to the client in Step 1020 and the sequence ends at Step 1034.

If the data is not present in the writable vdisk, then at Step 1026 the file system redirects its access to the backing store (i.e., snapshot file) that is linked (bound) to the vdisk in the active file system via a snapshot file handle. The snapshot file handle is essentially a pointer to the snapshot file contained in a snapshot; as noted, the snapshot file functions as the backing store for the writable vdisk. In the illustrative embodiment, the snapshot file handle is stored in both the attributes inode 840 of the vdisk and the VTOC 670. Although the authoritative source of the snapshot file handle is a file entry of the VTOC, the snapshot file handle may alternatively be acquired by accessing the attributes inode. Storage of the snapshot file handle in the attributes inode 840 of a vdisk ensures complete encapsulation of the "self-contained" vdisk, enabling resilience to data loss in the face of VTOC loss. Thus, if the requested (read) data is not stored in/with the lun inode 810, the file system accesses the VTOC 670 (or, alternatively, the attributes inode 840) to acquire the file handle of the backing store (Step 1028). The file system (and virtualization system 600) thereafter "follows" (uses) that file handle to retrieve the backing store file inode and requested data block in Step 1030. A determination is then made, in Step 1022, as to whether the request block was allocated to the writable, read-only snapshot or, more specifically, to the backing store of the writable, read-only snapshot. If not a block of NULLS is returned to the client in Step 1024. Otherwise, the requested (read) data is then returned to the client in Step 1032 and the sequence ends at Step 1034.

It should be noted that to the client, the read data retrieved from the writable, read-only snapshot is always the latest data written. The client "sees" the writable vdisk data first (if it exists) and is served that data, the underlying read-only snapshot image being inaccessible for the range of valid data in the writable vdisk. Read-only data from the underlying snapshot image is delivered to the client when no valid data overlying the range exists in the writable vdisk. The underlying snapshot image is accessible and recoverable via a non-translucent path of directly accessing the snapshot image. By this technique, data integrity of a snapshotted lun or vdisk (as an inviolate backup) is preserved.

The inventive writable read-only snapshot technique enables creation of multiple writable copies of a consistent image of a storage element, such as a file or file system, which can be diverged for different applications. That is, the inventive technique allows the use of multiple writable images in the active file system, each of which is backed by a single, common file in a snapshot. Unlike the prior art where writable copies of a storage element are limited by the number of mirrors that are configured, there are substantially no restrictions to the number of "cloned" vdisks having a common backing store (with the exception of free space/reservations in the entire volume). Each vdisk is a separate storage entity even though backed by the same snapshot file. Since they are not the same file, there may be multiple vdisk "instances" of the writable snapshot, each of which may be modified independently.

For example, assume an application of the writable read-only snapshot technique is directed to carrying out multiple independent exploratory tests starting from (and sharing the data stored in) a single snapshot file image of a vdisk. Assume further that these tests are directed to various approaches to solving a problem. If certain of these approaches do not work, then the data (information) associated with these approaches can be destroyed without consuming multiple copies of the original snapshot file. That is, only that data which is destroyed has been consumed with respect to storage capacity.

As another example of an application of the writable read-only snapshot, assume multiple instances of a file system are needed, wherein each instance functions as a boot disk for a particular computer in, e.g., a corporation. To efficiently create the boot disk, a snapshot of the active file system is taken and a vdisk is created for each instance of the file system. The snapshot "file" is then used as the backing store for each of the created vdisks such that each vdisk is associated with (references) a common read-only snapshot file. The operator of each computer may thereafter utilize its vdisk without having to make a copy of the original boot file in the active file system. That is, each operator can write to the file system/boot disk, modifying only the "front end" vdisk and not the shared read-only snapshot file.

Yet another application of the writable snapshot may be to "clone" a database. In this application, a snapshot is made of a database in the active file system. Thereafter, multiple versions (instances) of that database "file" are cloned through the use of the vdisk layer. The vdisk layer enables independent updates to each instance of the database, while all non-updated data blocks are shared among the vdisk instances. The writable vdisk instances of the database may thereafter be used for, e.g., testing and report generation purposes. The novel technique for creating and using/accessing writable read-only snapshots may be employed in this application.

Advantageously, the inventive technique supports clients having a "weak" notion of a read-only file system, while preserving the integrity of a snapshot image of a lun. The novel writable read-only snapshot further provides the advantages of writability, in addition to "reliability-on-account-of-inviolability" features of snapshots. The writable read-only snapshot can be employed using any protocol, network file system or block storage. The novel technique also allows for a multiple level structure of a "backed" vdisk to be backed up for data recovery purposes using tools that include, but are not limited to, SnapMirror and NDMP. On restoration, the restored vdisk image reflects all of the valid data previously existing as the multilevel structure.

Moreover, since each writable read-only snapshot comprises a writable vdisk in the active file system that is "backed" by a read-only snapshot file, multiple vdisks can be created, each of which references a common read-only snapshot file. Each vdisk can be written to independently and thus can have data stored therein that is different from the data stored in the other vdisks. For those data blocks that do not have modified/changed data written to the vdisk, corresponding data blocks in the read-only snapshot file are used to "fill" those holes in each of the vdisks.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for accessing a writable virtual disk (vdisk) residing in an active file system on a storage appliance executing a storage operating system, comprising:
   creating a backing store from an existing vdisk of the storage operating system, wherein the backing store comprises a read-only version of the existing vdisk;
   creating a new vdisk in the active file system;
   binding the new vdisk to the backing store to create the writable vdisk, wherein the writable vdisk is a sparse file in the active file system, wherein the sparse file consumes no storage space at creation, wherein the new vdisk is bound to the backing store using an attribute specifying the backing store;
   receiving a read access request for a block associated with the writable vdisk;
   determining whether the requested block is stored in the writable vdisk;

in response to determining that the requested block is not stored in the writable vdisk, accessing data from a block allocated to the backing store; and in response to the read request, returning the accessed data.

2. The method of claim 1 further comprising, in response to determining that the requested block is stored in the writable vdisk, accessing data from a block allocated to the writable vdisk.

3. The method of claim 1 further comprising:
determining whether the requested block is allocated to the backing store; and
in response to determining that the requested block is not allocated to the backing store, returning a block of nulls thereby indicating no data has been written to the requested block.

4. The method of claim 1 wherein a write operation stores write data associated with the write operation at the requested block of the writable vdisk.

5. The method of claim 1 further comprising:
creating a plurality of writable vdisks from the backing store, wherein the attribute in each writeable vdisk includes a file handle identifying the backing store;
aggregating physical storage of portions of disks into a pool of blocks;
and dynamically allocating the portions of the disks to form each of the plurality of writable vdisks.

6. The method of claim 5 wherein accessing the data from a block allocated to the backing store further comprises using the file handle stored in the writable vdisk, wherein the file handle represents the backing store.

7. The method of claim 6 wherein accessing the data from a block allocated to the backing store comprises:
accessing a vdisk table of contents (VTOC) data structure to acquire a file handle of the backing store stored in the VTOC; and
accessing the requested block of the backing store using the file handle stored in the VTOC.

8. An apparatus for accessing a writable virtual disk (vdisk) of a snapshot object of an active file system on a storage appliance executing a storage operating system, the apparatus comprising:
means for creating a snapshot object, the snapshot object comprising a read-only version of an existing vdisk;
means for creating a new vdisk in the active file system;
means for binding the new vdisk to a backing store to create the writable vdisk, wherein the writable vdisk is a sparse file in the active file system, wherein the sparse file consumes no storage space at creation, wherein the new vdisk is bound to the backing store using an attribute specifying the backing store;
means for receiving a read access request for a block associated with the writable vdisk;
means for determining whether the requested block is stored in the writable vdisk;
in response to determining that the requested block is not stored in the writable vdisk, means for accessing data from a block allocated to the snapshot object; and
means for returning the accessed data.

9. The apparatus of claim 8 further comprising:
means for storing write data associated with a write operation at the requested block of the vdisk.

10. A non-transitory computer-readable storage medium stored with executable program instructions for execution by a processor, the computer-readable storage medium comprising:

program instructions that create a backing store from an existing virtual disk (vdisk) of a storage operating System;
program instructions that create a new vdisk in an active file system;
program instructions that bind the new vdisk to the backing store to create a writeable vdisk, wherein the writable vdisk is a sparse data structure, wherein the sparse data structure consumes no storage space at creation, wherein the new vdisk is bound to the backing store using an attribute specifying the backing store;
program instructions that receive a read access request for a block associated with the writable vdisk;
is program instructions that determine whether the requested block is stored in the writable vdisk;
program instructions that, in response to determining that the requested block is not stored in the writable vdisk, accessing data from a block allocated to the backing store; and
program instructions that, in response to the read request, return the accessed data.

11. A system, comprising:
a multi-protocol storage system configured to connect to a plurality of storage devices; and
the multi-protocol storage system configured to execute a storage operating system,
the storage operating system configured to generate a snapshot of an existing virtual disk (vdisk) for storage on a storage device of the plurality of storage devices, wherein the snapshot is a read-only image;
the storage operating system further configured to create a new vdisk, and
the storage operating system further configured to bind the new vdisk to the read-only image to create a writable vdisk, the new vdisk bound to the read-only image using an attribute identifying the read-only image as a backing store of the storage operating system, wherein the writable vdisk resides in an active file system, wherein the writable vdisk is a sparse file in the active file system, and wherein the sparse file consumes no storage space at creation.

12. The system of claim 11 wherein the writeable vdisk is a shadow image of the read-only image.

13. The system of claim 11 wherein the attribute includes a file handle, and wherein the storage operating system is further configured to create a virtual disk table of contents (VTOC) data structure including the file handle of the read-only image.

14. The system of claim 13 further comprising a snapshot identifier (snapshot ID) stored in an attributes inode and the VTOC, the file handle containing the snapshot ID identifying the read-only image stored on the storage device.

15. The system of claim 14 wherein the file handle in the VTOC and is used to resolve a location of the read-only image in a storage space provided by the plurality of storage devices.

16. The system of claim 11 wherein the storage operating system is further configured to create a plurality of writable vdisks from the read-only image, wherein each writeable vdisk includes the attribute identifying the read-only image.

17. The system of claim 11 wherein the writable vdisk is space conservative such that a block from the read-only image is not duplicated in the writable vdisk.

18. The system of claim 11 wherein the writeable vdisk comprises a sparse file containing data received in a write request using a block access protocol, the write request directed to a block allocated to the read-only image.

19. The system of claim 16 wherein each writable vdisk of the plurality of writable vdisks is written to independently such that unmodified data blocks of each writable vdisk correspond to respective data blocks in the read-only image.

20. The method of claim 1 wherein the writable vdisk is created from the backing store, wherein the backing store resides in a file different from the active file of the writable vdisk.

\* \* \* \* \*

UNITED STATES PATENT AND TRADEMARK OFFICE
CERTIFICATE OF CORRECTION

PATENT NO. : 8,423,732 B1
APPLICATION NO. : 12/277053
DATED : April 16, 2013
INVENTOR(S) : Vijayan Rajan Page 1 of 1

It is certified that error appears in the above-identified patent and that said Letters Patent is hereby corrected as shown below:

In the Specifications:

In col. 2, line 12 should read:
data structures, such as ~~modes~~ inodes and data blocks, on disk are In col. 4, line 33 should read:
"mirror" of the database. By breaking the ~~minor~~ mirror using con- In col. 6, line 33 should read:
in co-pending and commonly assigned U.S. Pat. No. 7,873,700 issued on Jan.

In col. 8, line 43 should read:
442, and 444. The physical disks of each Raid ~~is~~ group In col. 9, line 18 should read:
semantics, such as the ~~is~~ Data ONTAP storage operating In col. 11, line 48 should read:
indirect inode that contains 1024 pointers, each of ~~is~~ which In col. 12, line 8 should read:
For ~~storm ing~~ storing data, such as application data, associated with In the Claims:

In col. 20, line 14 should read:
~~Is~~ program instructions that determine whether the Signed and Sealed this
Eighteenth Day of June, 2013

Teresa Stanek Rea
*Acting Director of the United States Patent and Trademark Office*